United States Patent [19]

Bearden

[11] Patent Number: 4,635,235

[45] Date of Patent: Jan. 6, 1987

[54] SEISMIC EXPLORATION SYSTEM IMPROVEMENT

[75] Inventor: Joe M. Bearden, Houston, Tex.

[73] Assignee: Texaco Inc., White Plains, N.Y.

[21] Appl. No.: 516,494

[22] Filed: Jul. 25, 1983

[51] Int. Cl.⁴ ...................... H04B 17/00; G01V 13/00
[52] U.S. Cl. ......................................... 367/13; 367/37; 367/154
[58] Field of Search .................. 367/37, 49, 55, 56, 367/59, 60, 63, 76, 80, 13, 16, 133, 154; 179/175.2 A, 175.2 AM, 175.3 F, 175.2 C, 175.3 A

[56] References Cited

U.S. PATENT DOCUMENTS

| | | | |
|---|---|---|---|
| 4,003,018 | 1/1978 | McCormick | 367/13 |
| 4,201,972 | 5/1980 | Edwards et al. | 367/60 |
| 4,285,052 | 8/1981 | Bobbitt | 367/79 |
| 4,320,468 | 3/1982 | Montross | 367/13 |
| 4,369,505 | 1/1983 | Carruth, Jr. | 367/76 |
| 4,369,507 | 1/1983 | Carruth, Jr. | 367/56 |
| 4,375,679 | 3/1983 | Park, Jr. et al. | 367/13 |

Primary Examiner—Salvatore Cangialosi
Assistant Examiner—Ian J. Lobo
Attorney, Agent, or Firm—Robert A. Kulason; Henry C. Dearborn; Ronald G. Gillespie

[57] ABSTRACT

A seismic exploration system where a plurality of geophone locations are employed in one spread along a survey line. The recording procedure uses a roll-along switch for successively connecting a lesser number of recording channels to the geophone locations as separate records are taken without changing the spread. A signal is superimposed at one of the geophone locations. The signal is outside the useful range of seismic energy so that the particular geophone location may be identified on successive records without interfering with the recording of the seismic energy.

5 Claims, 1 Drawing Figure

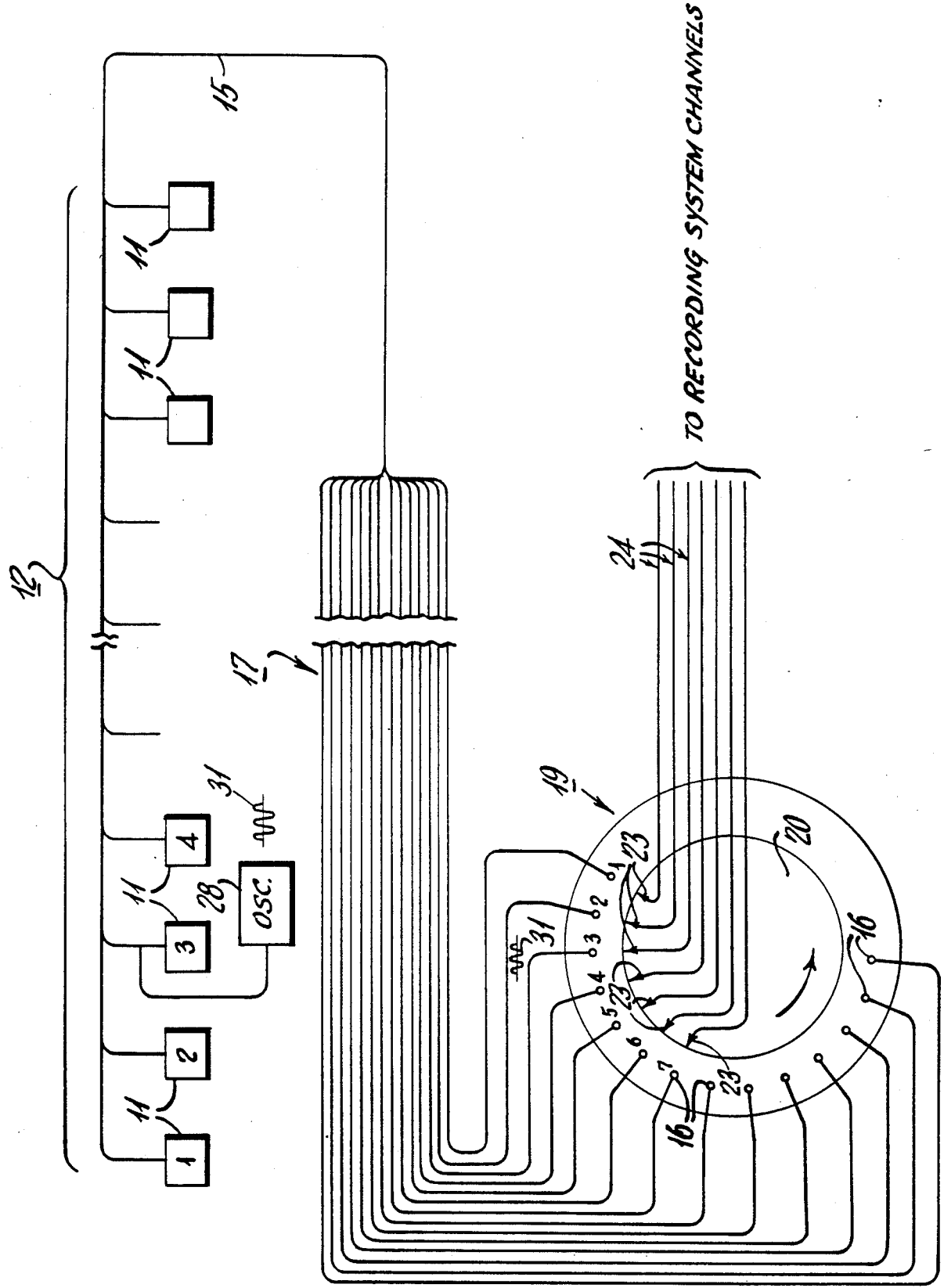

SEISMIC EXPLORATION SYSTEM IMPROVEMENT

This invention concerns seismic exploration in general. More specifically it relates to the matter of identifying a particular one of a plurality of geophone locations that are in a spread along a survey line. It applies particularly to a system using a roll-along common depth point switch where the number of channels in the recording system is less than the number of geophone locations that are set out along the spread.

BACKGROUND OF THE INVENTION

Seismic exploration systems now employ long spreads of a plurality of geophone locations that are laid out along a survey line with many more such locations than the number of channels in a recording unit. Consequently, during the recording of individual seismic records the system makes use of a much lesser number of the geophone groups or locations than there are laid out along the spread. The procedure commonly employed for developing data to be used in common depth point compositing of records, is facilitated by using a so-called roll along switch in connection with the making of a series of recordings to be composited. Such as roll along switch has a rotary set of contacts that make circuit connections with the recording channels. Then, by rotation of the switch the circuit connections are made to successive ones of the geophone locations in a step by step manner as individual records are taken. Often this may be carried out automatically as a series of records are taken with the roll-along switch in successive positions. Consequently, the chances of misidentifying the geographic location of the source of seismic signals related to the connected channels of a given record are quite considerable. The misidentification would be as to the channels which were connected to particular ones of the geophone locations. Sources of error include such situations as the fact that the common depth point switch did not change position, or the location of a particular geophone position in the spread was not correct, or the position of the recording truck to which the various geophone positions are connected was in error.

Consequently it is an object of this invention to provide for an identification means that may be applied to a particular one of a plurality of geophone connections or locations in order to identify that specific location along a spread. It is particularly useful as a series of changed connections are made during the making of recordings.

Another object of the invention is to make use of a signal generator outside the range of useful seismic energies which may be applied to a particular one of a plurality of geophone locations along a seismic spread as laid out on a survey line. By means of that signal the the particular location may be identified on each record.

SUMMARY OF THE INVENTION

The invention concerns a portion of a seismic exploration system having a plurality of geophone locations along a survey line with at least one geophone connected to each of a plurality of separate circuits connected to corresponding terminals of a roll along common depth point switch. It concerns means for identifying a specific one of said geophone locations as said switch changes connections, and it comprises means for superimposing a signal outside the useful range of seismic energy signals generated by said geophones, on the one of said separate circuits connected to said specific geophone location whereby said location may be identified on the changed connection side of said switch.

Again briefly, the invention is in a seismic exploration system having greater number of geophone locations along a survey line than the number of separate channels in a recording system. The said exploration system has separate circuits connected to said geophone locations and includes a roll-along common depth point switch for selectively connecting said separate channels to different ones of said separate geophone circuits. It also includes means for identifying a specific one of said geophone locations on one of said separate channels in order to determine which channel is connected to said specific geophone location, and it comprises a 3000 Hertz oscillator and means for coupling said oscillator to the specific one of said geophone location circuits at said specific geophone location. The arrangement is such that said location may be identified on one of said channels as said recording system is operated.

BRIEF DESCRIPTION OF THE DRAWING

The figure of drawing illustrates a schematic showing of a spread of geophones or geophone locations with circuit connections from each to a rotary roll along common depth point type switch.

DESCRIPTION OF THE PREFERRED EMBODIMENT

In modern seismic geophysical operations it is usual to lay out a spread of geophones, or geophone groups, that is extensive in distance covered. Each geophone or group of geophones is connected via an electric cable which has individual circuits for connection to a recording truck where the seismic records are made. The spread of geophones or groups may extend for a mile or more and the recording truck which is connected to the geophone circuits has a limited number of recording channels that are employed in making each of a series of records. The number of channels is considerably less than the total number of geophone locations on the spread.

The usual procedure involves making records of seismic energy in vibratory or explosive form. Such records are made in a series, one after another. The records are made with connections from a predetermined number of the geophones (or groups) on the spread, which number corresponds to the number of the recording channels. And, by moving a rotary switch the channels are successively connected to the same number of geophones (or groups) which number is less than the total number on the spread. Thereafter, the records are processed to develop common depth point data which enhances the reflections of seismic energy appearing on the records from various subsurface reflecting layers.

During the foregoing procedure, much of the operations are done automatically and it may happen that the switch which is employed may fail to step from one position to the next, or otherwise malfunction. Consequently, the records made may be erroneous in the relationship of the data recorded, particularly as to the geographical source of such records. However, by making use of this invention, a particular one of the geophone locations on the spread will be specifically identified. Therefore, the channel to which the identified geophone circuit is connected (as records are made) will appear and any erroneous conditions (such as just mentioned) will become obvious immediately so that corrective action may be taken.

As indicated in the drawing the system includes a number of geophone locations 11 which are laid out along a survey line so as to form a spread 12 of such geophone locations. Each of the geophone locations 11 has an individual circuit included in a cable 15 that extends along the spread 12. These circuits in the cable 15 include circuit connections 17 as schematically indicated, which make connections to a series of terminals 16. These terminals are located on a rotary switch 19 which is commonly known as a roll-along common depth point switch. As schematically indicated, the switch 19 has a rotor 20 that carries a plurality of contactors 23. It will be appreciated that the rotor 20 could be stationary if the part having the terminals 16 were rotatable.

It will be observed that the rotor 20 may be positioned by rotating counterclockwise, as indicated by the arrow so that the plurality of contactors 23 will shift a plurality of individual circuits 24 which go to recording system channels (as indicated by the caption) from one group of the circuit connections 17 to the next.

In the illustrated diagram, the rotary switch 19 has contactors 23 making circuit connections to the first seven of the circuits 17 in cable 15, i.e. those which go to the geophone locations starting at the left hand end of the spread 12 illustrated. And, after a record has been made with the switch 19 in that position, the rotor 20 will be shifted to the next position where the contactors 23 will then be connected to the geophone positions 11 beginning at the one numbered 2 in the diagram.

There is an oscillator 28 that is connected into the circuit connection 17 which leads to the geophone location numbered 3 in the diagram. It will be understood that that individual illustration circuit 17 leads to the stator position numbered 3 of the switch 19. Oscillator 28 has a frequency that is outside the useful range of seismic energies so as to provide no interference with seismic signals and also for ready identification. It (oscillator 28) is located in any feasible manner so as to be connected into, i.e. coupled with, that circuit 17 which connects to the geophone location 11 that it is desired to identify.

It will be appreciated that coupling of the oscillator 28 may be done by physically locating it along the spread 12, and the connection may be made in any feasible manner. In the drawing the geophone location 11 that is numbered 3 has the oscillator 28 connected into its circuit 17. Also there is an oscillator signal which is schematically indicated by a wave form 31. It is that signal which is coupled onto the circuit connected to the geophone location numbered 3 and therefore it appears at the terminal 16 which carries the number 3 on the stator of the switch 19. Consequently a particular geophone location 11 has its circuit 17 identified irrespective of the position of the rotor 20. Thus, a particular geophone location may be identified on the channel circuit 24 to which its circuit 17 is connected.

It will be appreciated that the illustration is schematic, and it would ordinarily be expected that the identification signal 31 of oscillator 28 would be coupled onto one of the geophone locations 11 toward the center of the spread 12. That would be done in order that the signal 31 would appear on all of the records being taken as a series of records are made from a single spread 12.

It will be appreciated that the oscillator 28 might take various forms, and while a battery powered oscillator would be quite feasible, it could also be powered by a silicon solar cell power source in order to minimize maintenance attention. It will also be understood that the oscillator 28 may be coupled to the desired circuit 17 in any feasible manner e.g. by inductive, capacitive or resistive connections.

As indicated, by the foregoing, it will be appreciated that upon detection of the oscillator signal (indicated by wave form 31) at the recording site on one of the channel circuits 24, the physical location of the oscillator or the geophone location, e.g. location 11 numbered 3 can be determined in relation to the common depth point switch (e.g. rotary switch 19) position. Thus, a decision can be arrived at concerning whether the switch is positioned correctly. In addition, the information concerning the physical location gives an indication concerning the location of the recording site by indicating the position of the location device itself or the geophone location to which it is coupled, as to whether they are correct.

While the foregoing description has been made in considerable detail in accordance with the applicable statutes, it is not to be taken as in any way limiting the invention but merely as being descriptive thereof.

I claim:

1. In a seismic exploration system having a plurality of geophone locations along a survey line with at least one geophone connected to each of a plurality of separate circuits connected to corresponding terminals of a roll-along common depth point switch, means for identifying a specific one of said geophone locations as said switch changes connections, comprising
means for superimposing a signal outside the useful range of seismic energy signals generated by said geophones on the one of said separate circuits connected to said specific geophone location whereby said location may be identified on the changed connection side of said switch.

2. The invention according to claim 1, wherein
said means for superimposing a signal comprises an oscillator having a frequency above said useful range.

3. The invention according to claim 2, wherein
said means for superimposing a signal also comprises means for coupling said oscillator to said separate circuit.

4. The invention according to claim 3, wherein
said oscillator frequency is three thousand hertz.

5. In a seismic exploration system having greater number of geophone locations along a survey line than the number of separate channels in a recording system, said exploration system having separate circuits connected to said geophone locations and including a roll along common depth point switch for selectively connecting said separate channels to different ones of said separate geophone location circuits, means for identifying a specific one of said geophone locations on one of said separate channels in order to determine which channel is connected to said specific geophone location, comprising
a three thousand hertz oscillator, and
means for coupling said oscillator to the specific one of said geophone location circuits at said specific geophone location whereby said location may be identified on one of said separate channels as said recording system is operated.

* * * * *